(12) United States Patent
Ishii et al.

(10) Patent No.: US 8,896,267 B2
(45) Date of Patent: Nov. 25, 2014

(54) CHARGING CONTROL DEVICE, VEHICLE INCLUDING THE SAME AND CHARGING CONTROL METHOD

(71) Applicants: Daisuke Ishii, Toyota (JP); Shinji Ichikawa, Toyota (JP)

(72) Inventors: Daisuke Ishii, Toyota (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/061,055

(22) Filed: Oct. 23, 2013

(65) Prior Publication Data

US 2014/0042985 A1  Feb. 13, 2014

Related U.S. Application Data

(63) Continuation of application No. PCT/JP2011/060819, filed on May 11, 2011.

(51) Int. Cl.
*H02J 7/00* (2006.01)
*B60L 1/00* (2006.01)
*B60L 11/18* (2006.01)
*H02J 7/04* (2006.01)
*H01M 10/44* (2006.01)

(52) U.S. Cl.
CPC ............... *B60L 11/1809* (2013.01); *B60L 1/00* (2013.01); *Y02T 10/705* (2013.01); *H02J 7/0073* (2013.01); *Y02T 10/7044* (2013.01); *H02J 7/041* (2013.01); *Y02T 10/7005* (2013.01); *Y02T 90/14* (2013.01); *Y02T 10/7088* (2013.01); *B60L 11/1861* (2013.01); *H01M 10/44* (2013.01)
USPC .......................................................... 320/109

(58) Field of Classification Search
CPC ............ Y02T 10/7005; Y02T 10/7044; Y02T 90/163
USPC .......................................................... 320/109
See application file for complete search history.

(56) References Cited

U.S. PATENT DOCUMENTS

| 5,623,194 | A | * | 4/1997 | Boll et al. ...................... 320/137 |
| 5,952,813 | A | | 9/1999 | Ochiai |
| 8,106,627 | B1 | * | 1/2012 | Rossi ............................. 320/109 |
| 8,423,219 | B2 | * | 4/2013 | Tofukuji et al. ............... 320/109 |
| 8,504,227 | B2 | * | 8/2013 | Ichishi ............................. 701/22 |
| 8,552,682 | B2 | * | 10/2013 | Potter ........................... 320/104 |
| 2010/0217485 | A1 | | 8/2010 | Ichishi |

(Continued)

FOREIGN PATENT DOCUMENTS

| JP | A-8-98420 | 4/1996 |
| JP | A-10-290533 | 10/1998 |
| JP | A-2009-136109 | 6/2009 |
| JP | A-2010-213502 | 9/2010 |

*Primary Examiner* — Edward Tso
*Assistant Examiner* — Ramy Ramadan
(74) *Attorney, Agent, or Firm* — Oliff PLC

(57) ABSTRACT

A charging schedule creation unit creates a charging schedule of a power storage device by an external power supply. A charging control unit executes charging control of the power storage device in accordance with the charging schedule. A condition determination unit turns on a charging continuation flag to be output to the charging control unit when a predetermined charging continuation permitting condition holds in the case where charging is not completed in accordance with the charging schedule. When the charging continuation flag is on, the charging control unit executes charging control such that charging is continued even after a charging end timing in accordance with the charging schedule.

15 Claims, 6 Drawing Sheets

(56) References Cited

U.S. PATENT DOCUMENTS

2011/0016063 A1* 1/2011 Pollack et al. ............... 705/412
2011/0022256 A1* 1/2011 Asada et al. .................. 701/22
2011/0193522 A1* 8/2011 Uesugi ......................... 320/109

* cited by examiner

CHARGING CONTROL DEVICE, VEHICLE INCLUDING THE SAME AND CHARGING CONTROL METHOD

This is a continuation application of International Patent Application No. PCT/JP2011/060819 filed on May 11, 2011, the entire contents of which are hereby incorporated by reference.

BACKGROUND OF THE INVENTION

1. Field of the Invention

The present invention relates to a charging control device, a vehicle including the same and a charging control method, and more particularly relates to a charging control device for charging a power storage device mounted on a vehicle by a power supply outside the vehicle, a vehicle including the same and a charging control method.

2. Description of the Background Art

Japanese Patent Laying-Open No. 8-98420 (Patent Document 1) discloses a charging device of a battery mounted on a vehicle as a motive power supply of the vehicle. In this charging device, when a charging end time is set to start charging reservation, charging of the battery is started immediately. When a battery voltage reaches a specified value after the start of charging, charging is interrupted. A recharging time required for full charge is then calculated to determine a charging restart time. Thereafter, charging of the battery is restarted when the charging restart time arrives. Finally, it is determined whether or not the charging restart time has arrived, and the charging restart time has arrived, charging is terminated to complete charging. According to this charging device, charging can be completed at the set charging end time (see Patent Document 1).

SUMMARY OF THE INVENTION

If charging of the battery is interrupted or charging power changes due to a reason not owing to a charging schedule, charging of the battery may not be completed at the charging end time in accordance with the charging schedule. The above-mentioned charging device disclosed in Japanese Patent Laying-Open No. 8-98420 does not particularly study such a case.

It is therefore an object of the present invention to provide a charging control device capable of performing charging appropriately even when charging of a power storage device is not completed in accordance with a charging schedule, and a vehicle including the same.

Another object of the present invention is to provide a charging control method capable of performing charging appropriately even when charging of a power storage device is not completed in accordance with a charging schedule.

According to the present invention, a charging control device is a charging control device for charging a power storage device mounted on a vehicle by a power supply outside the vehicle, including a creation unit and a control unit. The creation unit creates a charging schedule of the power storage device by the power supply outside the vehicle. The control unit executes charging control of the power storage device in accordance with the charging schedule. The control unit executes the charging control such that charging is continued even after a charging end timing in accordance with the charging schedule when a predetermined charging continuation permitting condition holds in the case where charging is not completed in accordance with the charging schedule. The charging continuation permitting condition holds in the case where an air conditioner for adjusting a vehicle interior temperature is operated during charging.

Preferably, the control unit executes the charging control such that charging is continued even after a charging end time in accordance with the charging schedule when the predetermined charging continuation permitting condition holds in the case where charging is not completed at the charging end time.

Preferably, the control unit executes the charging control without following the charging schedule when the predetermined charging continuation permitting condition holds in the case where charging is not completed in accordance with the charging schedule.

Preferably, the control unit terminates charging at the charging end timing when the predetermined charging continuation permitting condition does not hold.

Preferably, the charging continuation permitting condition holds in the case where charging is interrupted due to a power failure of the power supply.

Preferably, the charging continuation permitting condition holds in the case where there is a change in setting of electric power supplied from the power supply.

Preferably, the charging control device further includes an input unit. The input unit allows a user to select whether or not charging is continued even after the charging end timing.

According to the present invention, a vehicle includes any one of the charging control devices described above.

According to the present invention, a charging control method is a charging control method for charging a power storage device mounted on a vehicle by a power supply outside the vehicle, including the steps of creating a charging schedule of the power storage device by the power supply outside the vehicle, and executing charging control of the power storage device in accordance with the charging schedule. The step of executing the charging control includes the step of continuing charging even after a charging end timing in accordance with the charging schedule when a predetermined charging continuation permitting condition holds in the case where charging is not completed in accordance with the charging schedule. The charging continuation permitting condition holds in the case where an air conditioner for adjusting a vehicle interior temperature is operated during charging.

Preferably, the step of continuing charging includes the step of continuing charging even after a charging end time in accordance with the charging schedule when the predetermined charging continuation permitting condition holds in the case where charging is not completed at the charging end time.

Preferably, the charging continuation permitting condition holds in the case where charging is interrupted due to a power failure of the power supply.

Preferably, the charging continuation permitting condition holds in the case where there is a change in setting of electric power supplied from the power supply.

Preferably, the charging control method further includes the step for allowing a user to select whether or not charging is continued even after the charging end timing.

In the present invention, charging is continued even after the charging end timing in accordance with a charging schedule when a predetermined charging continuation permitting condition holds in the case where charging is not completed in accordance with the charging schedule. The case where charging is continued after the charging end timing is thereby limited, which can avoid unnecessary continuation of charging when charging is not completed in accordance with the charging schedule due to an interruption of charging by some failure, or the like. Therefore, according to the present invention, charging can be performed appropriately even in the case where charging of the power storage device is not completed in accordance with the charging schedule.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
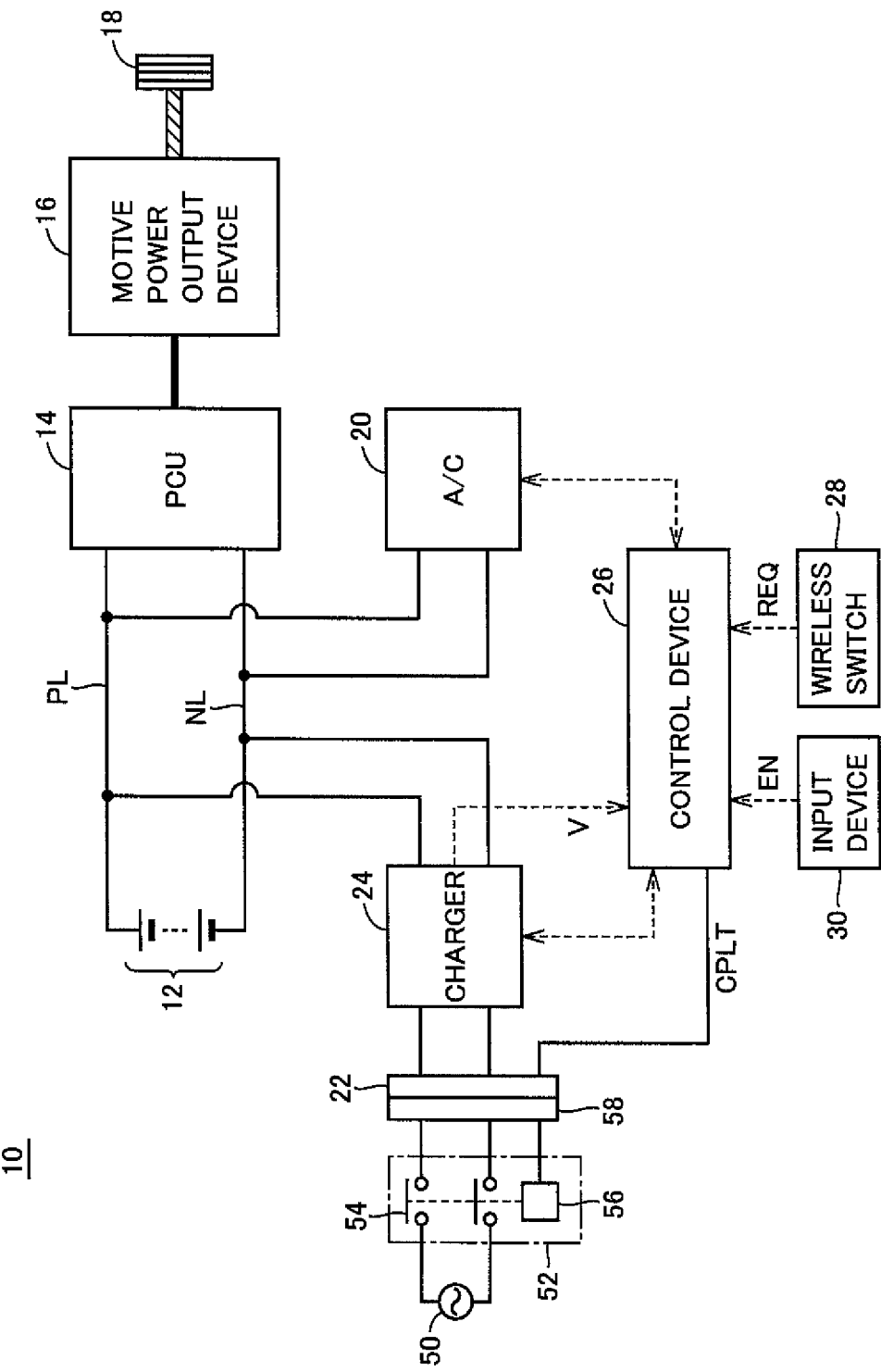
FIG. 1 is an overall block diagram of a vehicle including a charging control device according to an embodiment of the present invention.

Hereinafter, an embodiment of the present invention will be described in detail with reference to the drawings. The same or corresponding parts have the same reference characters allotted, and description thereof will not be repeated.

FIG. 1 is an overall block diagram of a vehicle including a charging control device according to an embodiment of the present invention. Referring to FIG. 1, a vehicle 10 includes a power storage device 12, a power control unit (hereinafter referred to as "PCU (Power Control Unit)") 14, a motive power output device 16, and a driving wheel 18. Vehicle 10 further includes an electric air conditioner (hereinafter referred to as "A/C") 20, an inlet 22, a charger 24, a control device 26, a wireless switch 28, and an input device 30.

Power storage device 12 is a rechargeable DC power supply, and is implemented by, for example, a nickel-metal hydride, lithium ion or similar secondary battery. Power storage device 12 stores electric power generated in motive power output device 16, in addition to electric power supplied from an external power supply 50 outside the vehicle and input through inlet 22. It is noted that a large-capacity capacitor can also be adopted as power storage device 12.

PCU 14 collectively shows a power converter for receiving electric power from power storage device 12 and driving motive power output device 16. For example, PCU 14 includes an inverter for driving a motor included in motive power output device 16, a converter boosting electric power output from power storage device 12 for supply to the inverter, and the like.

Motive power output device 16 collectively shows a device for driving driving wheel 18. For example, motive power output device 16 includes a motor, an engine and the like for driving driving wheel 18. Moreover, motive power output device 16 generates power during braking of the vehicle or the like by the motor that drives driving wheel 18 operating in a regeneration mode, and outputs the generated power to PCU 14.

A/C 20 is connected to a positive electrode line PL and a negative electrode line NL interconnected between power storage device 12 and PCU 14. A/C 20 includes an inverter not shown, an electric compressor driven by the inverter and the like, and operates upon receipt of supply of electric power from positive electrode line PL based on a control signal from control device 26.

External power supply 50, an EVSE (Electric Vehicle Supply Equipment) 52 and a connector 58 are provided outside vehicle 10. EVSE 52 includes a CCID (Charging Circuit Interrupt Device) 54 and a CPLT control circuit 56.

External power supply 50 is implemented by a commercial power supply, for example. EVSE 52 is configured to be capable of interrupting an electric circuit for supplying electric power from external power supply 50 to vehicle 10. EVSE 52 is provided in a charging cable for supplying electric power from external power supply 50 to vehicle 10, a charging stand for supplying electric power to vehicle 10 through a charging cable, or the like. CCID 54 is a breaker provided in a feed route from external power supply 50 to vehicle 10, and is controlled by CPLT control circuit 56.

CPLT control circuit 56 operates upon receipt of electric power from external power supply 50. CPLT control circuit 56 generates a pilot signal CPLT, and outputs generated pilot signal CPLT to vehicle 10 through a control pilot line. Pilot signal CPLT is controlled in potential in control device 26 of vehicle 10, and CPLT control circuit 56 controls CCID 54 based on the potential of pilot signal CPLT. That is, CCID 54 can be remotely controlled from vehicle 10 by controlling the potential of pilot signal CPLT in control device 26 of vehicle 10.

Moreover, CPLT control circuit 56 oscillates pilot signal CPLT at a duty ratio defined in correspondence with a rated current that can be supplied from external power supply 50 to vehicle 10 through the charging cable. That is, the rated current is reported from EVSE 52 to vehicle 10 depending on the duty ratio of pilot signal CPLT. It is noted that this pilot signal CPLT conforms to "SAE J1772 (SAE Electric Vehicle Conductive Charge Coupler)" of the United States of America, for example.

Inlet 22 is configured to be capable of being connected to connector 58 of the charging cable for supplying electric power from external power supply 50 to vehicle 10. Inlet 22 receives electric power supplied from external power supply 50 during charging of power storage device 12 from external power supply 50 (hereinafter referred to as "external charging").

Charger 24 is connected to positive electrode line PL and negative electrode line NL. Charger 24 converts electric power input through inlet 22 to a predetermined charging voltage (DC) based on a control signal from control device 26. Then, electric power converted in voltage by charger 24 is supplied to power storage device 12 through positive electrode line PL and negative electrode line NL, so that power storage device 12 is charged. It is noted that charger 24 is provided with a voltage sensor for detecting a voltage V of electric power input through inlet 22, and a detection value of voltage V is output to control device 26.

It is noted that charger 24 is connected to positive electrode line PL and negative electrode line NL together with A/C 20. When A/C 20 operates during external charging (pre-air-conditioning), part of electric power output from charger 24 is supplied to A/C 20.

Wireless switch 28 is a switch for a user to remotely request pre-air-conditioning for air-conditioning the vehicle interior before he/she boards. If wireless switch 28 is turned on by the user, a pre-air-conditioning request signal REQ is transmitted wirelessly from wireless switch 28 to control device 26. It is noted that wireless switch 28 is configured integrally with an electronic key, for example.

Input device 30 is an interface device that can be operated by the user. Input device 30 is configured to allow the user to input an end timing of external charging. The following will describe that input device 30 should be configured to allow the user to input the end time of external charging (hereinafter referred to as "charging end time"), however, it may be configured such that a charging time, charged power amount or the like can be input instead of the charging end time. Input device 30 also includes an input unit for a user to select whether or not external charging is continued even after the charging end time disregarding a charging schedule created based on the charging end time. It is noted that detailed description in this respect will be given below.

Control device 26 executes various processes for controlling charging of power storage device 12 by charger 24 during external charging. Specifically, control device 26 creates the charging schedule of external charging based on the charging end time input in input device 30, and controls charger 24 to execute external charging in accordance with the charging schedule.

Control device 26 also executes ON/OFF operations of CCID 54 of EVSE 52. The ON/OFF operations of CCID 54 are remotely controlled by control device 26 using pilot signal CPLT received from CPLT control circuit 56 of EVSE 52. That is, control device 26 remotely controls CCID 54 by controlling the potential of pilot signal CPLT. It is noted that control device 26 detects the rated current of charging power depending on the duty ratio of pilot signal CPLT, as described above.

Moreover, upon receipt of pre-air-conditioning request signal REQ from wireless switch 28, control device 26 operates A/C 20 to conduct pre-air-conditioning. Control device 26 also makes a determination of a power failure of external power supply 50 during external charging based on a detection value of voltage V from the voltage sensor (not shown) provided in charger 24 and pilot signal CPLT.

The structure of this control device 26 will now be described in more detail.

Figure 2:
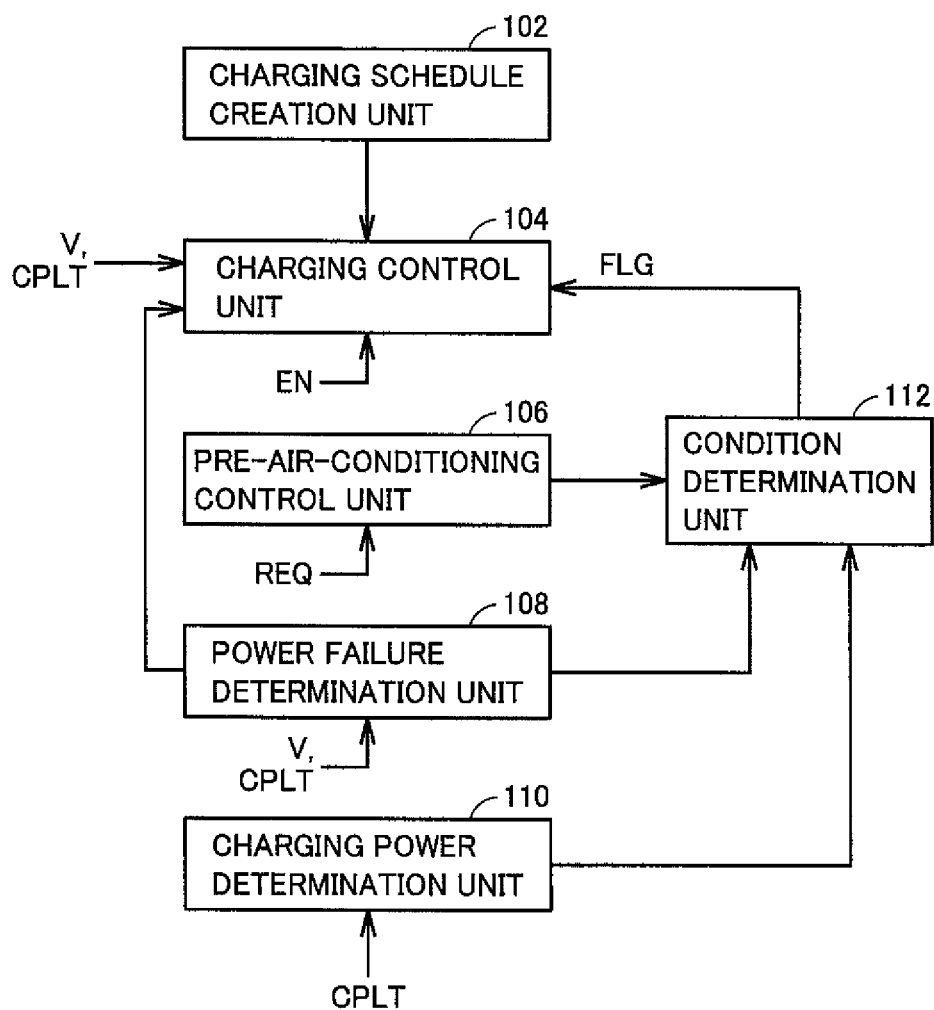
FIG. 2 is a functional block diagram of a control device.

FIG. 2 is a functional block diagram of control device 26. Referring to FIG. 2, control device 26 includes a charging schedule creation unit 102, a charging control unit 104, a pre-air-conditioning control unit 106, a power failure determination unit 108, a charging power determination unit 110, and a condition determination unit 112.

Charging schedule creation unit 102 creates a charging schedule of external charging. Specifically, when the charging end time is set by the user in input device 30, the charging schedule is created such that external charging is completed at the charging end time. A specific charging schedule will be described later with reference to the drawings.

Charging control unit 104 controls the operation of charger 24 in accordance with the charging schedule created by charging schedule creation unit 102. Specifically, when charging is executed in accordance with the charging schedule, charging control unit 104 generates a signal for driving charger 24 based on the detection value of voltage V received from charger 24 and a rated current value indicated by pilot signal CPLT, and outputs the signal to charger 24. It is noted that, upon receipt of a report from power failure determination unit 108 that a power failure occurs at external power supply 50, charging control unit 104 stops the operation of charger 24.

Charging control unit 104 also receives, from condition determination unit 112, a charging continuation flag FLG for indicating that external charging is continued even after the charging end time in the case where external charging is not terminated in accordance with the charging schedule. Further, charging control unit 104 receives, from input device 30, a charging continuation permitting signal EN indicating whether or not the user has selected that external charging is continued even after the charging end time. Then, when both charging continuation permitting signal EN and charging continuation flag FLG are both turned on, charging control unit 104 drives charger 24 even after the charging end time, disregarding the charging schedule created by charging schedule creation unit 102.

Upon receipt of pre-air-conditioning request signal REQ from wireless switch 28, pre-air-conditioning control unit 106 generates a signal for driving A/C 20, and outputs the signal to A/C 20. Then, when pre-air-conditioning is executed during external charging, pre-air-conditioning control unit 106 reports to that effect to condition determination unit 112. It is noted that, since part of electric power output from charger 24 is supplied to A/C 20 when pre-air-conditioning is executed during external charging, charging power supplied to power storage device 12 is reduced by that amount.

Figure 3:
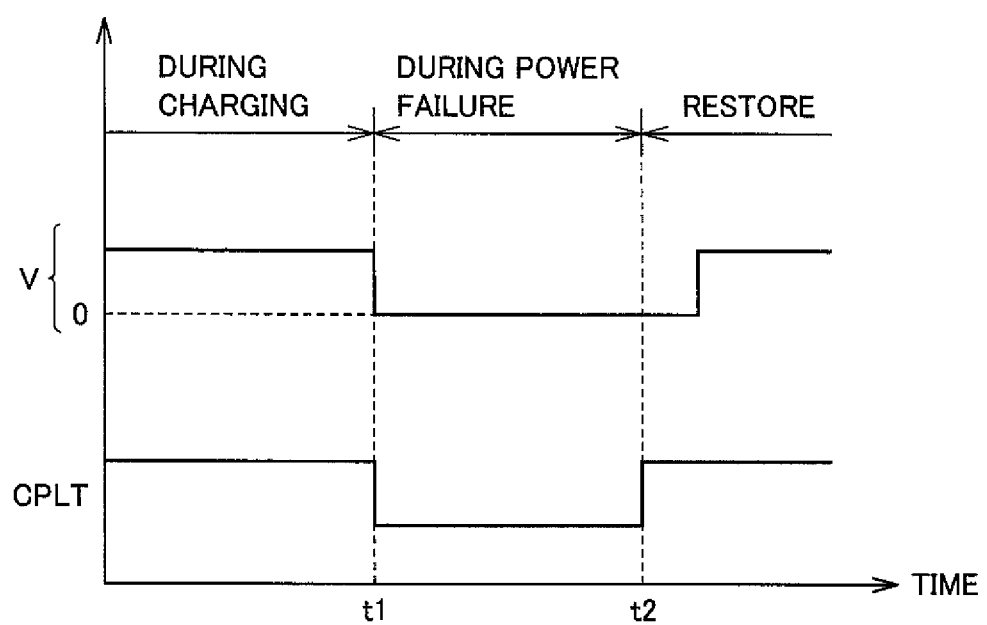
FIG. 3 is a drawing showing an example of determination of a power failure of an external power supply.

Power failure determination unit 108 makes a determination of a power failure of external power supply 50 based on voltage V detected in charger 24 and pilot signal CPLT. As shown in FIG. 3, for example, when voltage V is 0 and there is no input of pilot signal CPLT, power failure determination unit 108 determines that a power failure occurs at external power supply 50. Then, when it is determined that a power failure occurs at external power supply 50, power failure determination unit 108 reports to that effect to charging control unit 104 and condition determination unit 112.

Referring to FIG. 2 again, charging power determination unit 110 receives pilot signal CPLT, and when the duty ratio of pilot signal CPLT changes, reports to that effect to condition determination unit 112. That is, when the rated current of charging power varies (decreases), charging power determination unit 110 reports to that effect to condition determination unit 112.

Upon receipt of a report from pre-air-conditioning control unit 106 that pre-air-conditioning has been executed during external charging, condition determination unit 112 determines that a charging continuation permitting condition holds which permits continuation of external charging even after the charging end time in the case where external charging is not completed in accordance with the charging schedule. Condition determination unit 112 also determines that the charging continuation permitting condition holds when a report that a determination that a power failure occurs at external power supply 50 has been made is received from power failure determination unit 108. Further, condition determination unit 112 also determines that the charging continuation permitting condition holds when a report that the rated current of charging power has varied (decreased) is received from charging power determination unit 110. Then, when the charging continuation permitting condition holds, condition determination unit 112 turns on charging continuation flag FLG to be output to charging control unit 104.

By providing such condition determination unit 112, charging of power storage device 12 can be completed by continuing external charging even after the charging end time in the case where external charging is not completed in accordance with the charging schedule due to some reason not owing to an equipment failure. In other words, in the case where external charging is not completed in accordance with the charging schedule due to a failure of charger 24 or the like, external charging can be prevented from being continued after the charging end time.

Figure 4:
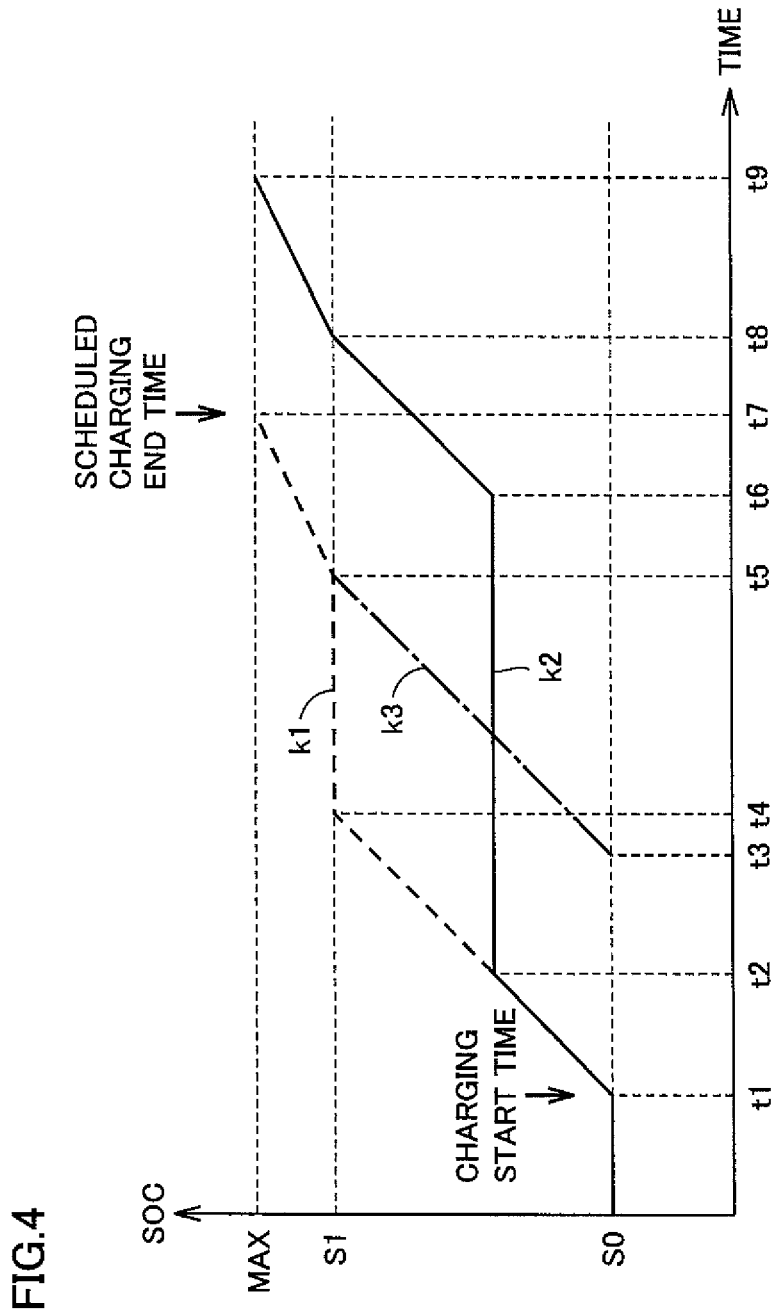
FIG. 4 is a drawing showing an example of SOC changes in a power storage device during external charging.

FIG. 4 is a drawing showing an example of SOC changes in power storage device 12 during external charging. Referring to FIG. 4, a dotted line k1 indicates a time variation in SOC in the case where external charging is completed in accordance with the charging schedule, and a solid line k2 indicates a time variation in SOC in the case where external charging is not completed in accordance with the charging schedule. It is noted that this FIG. 4 representatively shows the case where a power failure occurs at external power supply 50 during external charging as the case where external charging is not completed in accordance with the charging schedule.

At time t1, external charging shall be started from the state where SOC is S0. If charging is not interrupted by a power failure of external power supply 50 or the like during external charging, charging is executed after the start of charging at time t1 until SOC reaches S1 at time t4 (dotted line k1). It is noted that this S1 is set at a predetermined value lower than a fully charged amount MAX for suppressing degradation of power storage device 12. Then, the charging time to reach the fully charged amount MAX is estimated, and charging is restarted at time t5 such that charging is completed at time t7 which is a scheduled end time.

On the other hand, at time t2, external charging shall be interrupted by a power failure of external power supply 50 (solid line k2). Then, charging is restarted with external power supply 50 being restored at time t6, and in the case where charging is not completed at time t7 which is the scheduled end time, charging is continued even after time t7 which is the scheduled end time, disregarding the charging schedule. That is, charging is continued even after the scheduled end time disregarding the charging schedule only in the case where the reason for which charging has not been completed in accordance with the charging schedule can be specified (in this embodiment, as an example, an interruption of charging due to a power failure of external power supply 50, a decrease in input to power storage device 12 due to a pre-air-conditioning request, or a change in rated current of charging power).

It is noted that a long dashed short dashed line k3 indicates the lowest line where external charging is not completed at the scheduled end time (t7), and when the state of SOC lower than this long dashed short dashed line k3 occurs, it is determined whether or not external charging is continued after time t7 which is the scheduled end time disregarding the charging schedule.

Figure 5:
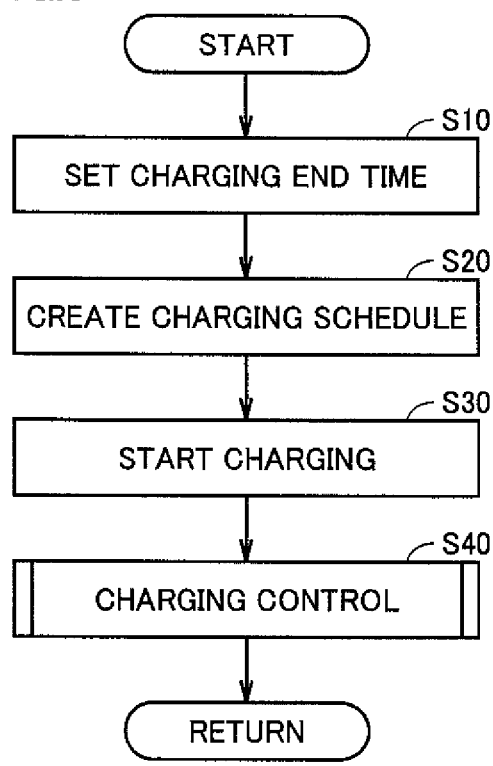
FIG. 5 is a flowchart for explaining the procedure of charging control executed in this embodiment.

FIG. 5 is a flowchart for explaining the procedure of charging control executed in this embodiment. Referring to FIG. 5, when the charging end time is set in input device 30 by the user (Step S10), control device 26 creates a charging schedule based on the set charging end time (Step S20). As an example, a charging schedule as indicated by dotted line k1 shown in FIG. 4 is created. Then, when a predetermined charging execution condition holds, control device 26 starts external charging (Step S30), and executes charging control for charging power storage device 12 by external power supply 50 (Step S40).

Figure 6:
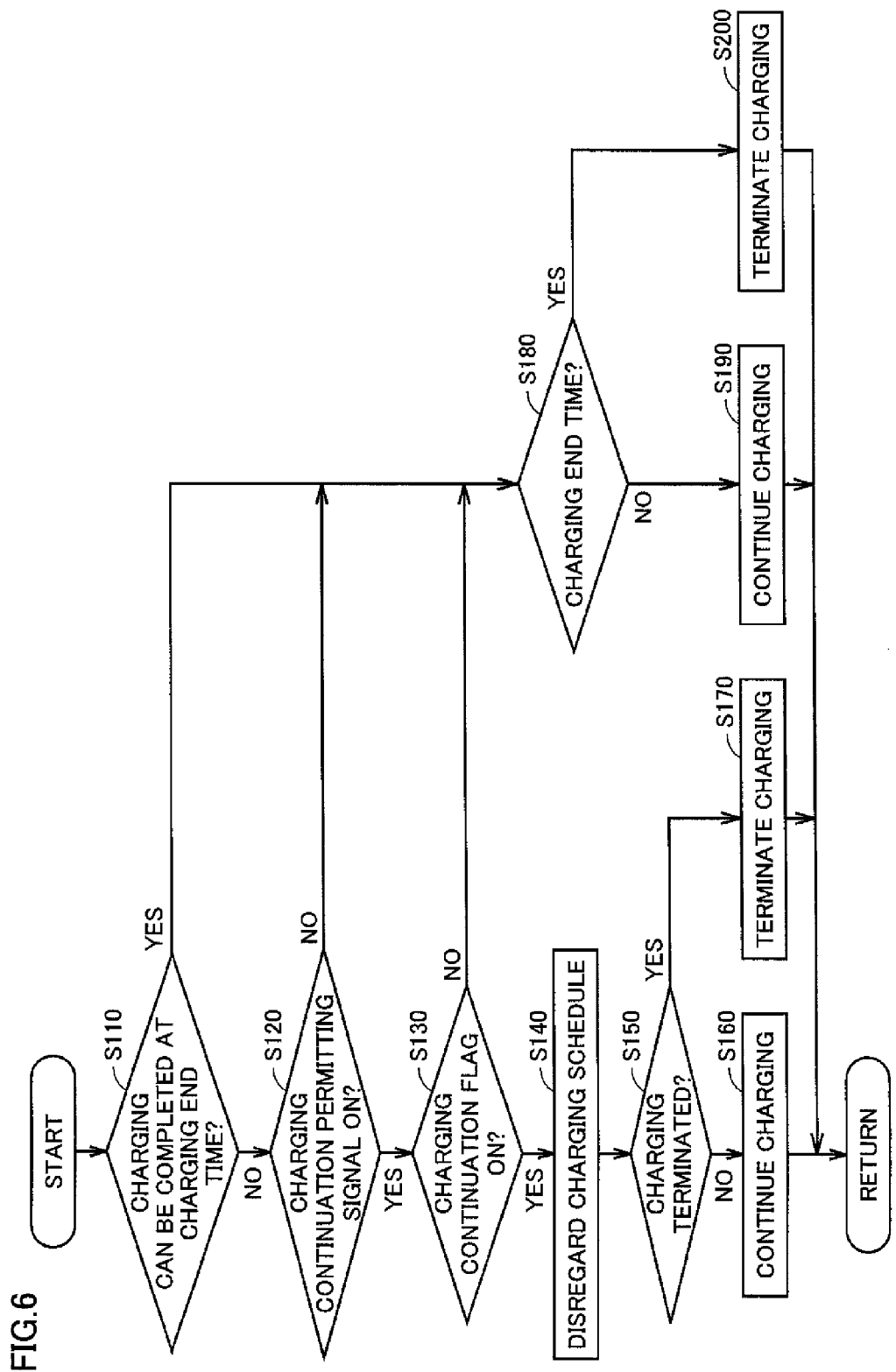
FIG. 6 is a flowchart for explaining the procedure of charging control executed by a control device in Step S40 shown in FIG. 5.

FIG. 6 is a flowchart for explaining the procedure of charging control executed by control device 26 in Step S40 shown in FIG. 5. It is noted that the process of this flowchart is executed every certain time period or each time a predetermined condition holds.

Referring to FIG. 6, control device 26 determines whether or not external charging can be completed at the charging end time set by the user (Step S110). Specifically, it is determined whether or not SOC of power storage device 12 falls below long dashed short dashed line k3 shown in FIG. 4, and when SOC falls below long dashed short dashed line k3, it is determined that external charging cannot be completed at the charging end time. When it is determined that external charging can be completed at the charging end time (YES in Step S110), control device 26 advances the process to Step S180 (as will be described later).

When it is determined in Step S110 that external charging cannot be completed at the charging end time (NO in Step S110), control device 26 determines whether or not charging continuation permitting signal EN received from input device 30 has been turned on (Step S120). It is noted that this charging continuation permitting signal EN is turned on when the user selects in input device 30 that external charging is continued even after the charging end time. When charging continuation permitting signal EN is off (NO in Step S120), control device 26 advances the process to Step S180.

When it is determined in Step S120 that charging continuation permitting signal EN has been turned on (YES in Step S120), control device 26 determines whether or not charging continuation flag FLG indicating that external charging is continued even after the charging end time in the case where external charging is not completed in accordance with the charging schedule has been turned on (Step S130). It is noted that, in this embodiment, charging continuation flag FLG is turned on when there is an interruption of charging due to a power failure of external power supply 50, a decrease in input to power storage device 12 due to a pre-air-conditioning request, or a change in rated current of charging power. When charging continuation flag FLG is off (NO in Step S130), control device 26 advances the process to Step S180.

When it is determined in Step S130 that charging continuation flag FLG is on (YES in Step S130), external charging is continued even after the charging end time disregarding the charging schedule (Step S140). Then, control device 26 makes an external charging end determination (Step S150). Control device 26 determines that external charging is to be terminated when SOC of power storage device 12 reaches the fully charged state or when connector 58 of the charging cable is disconnected from inlet 22, for example.

Then, when it is determined in Step S150 that charging is not yet terminated (NO in Step S150), control device 26 continues external charging (Step S160). When it is determined in Step S150 that charging is to be terminated (YES in Step S150), control device 26 executes a process of terminating external charging (Step S170).

On the other hand, control device 26 determines whether or not the charging end time has arrived (Step S180) when it is determined in Step S110 that charging can be completed at the charging end time (YES in Step S110), when it is determined in Step S120 that charging continuation permitting signal EN is off (YES in Step S120), or when it is determined in Step S130 that charging continuation flag FLG is off (NO in Step S130). When it is determined that the charging end time has not arrived (NO in Step S180), control device 26 continues external charging (Step S190). When it is determined in Step S180 that the charging end time has arrived (YES in Step S180), control device 26 executes the process of terminating external charging (Step S200).

As described above, in this embodiment, when the charging continuation permitting condition holds in the case where external charging is not completed in accordance with the charging schedule, charging is continued even after the charging end time in accordance with the charging schedule. The case where charging is continued after the charging end time is thereby limited, which can avoid unnecessary continuation of charging when the charging continuation permitting condition does not hold, such as in the case where charging is interrupted due to a failure of charger 24. Therefore, according to this embodiment, charging can be performed appropriately in the case where charging of power storage device 12 is not completed in accordance with the charging schedule.

Moreover, in this embodiment, in the case where external charging is not completed in accordance with the charging schedule, the user can select whether or not charging is continued even after the charging end time using input device 30. Therefore, this embodiment can achieve a convenient charging control device taking into account a user who does not wish to continue charging disregarding the charging schedule.

It is noted that, in the above-described embodiment, the charging continuation permitting condition shall hold when there is an interruption of charging due to a power failure of external power supply 50, a decrease in input to power storage device 12 due to a pre-air-conditioning request, or a change in rated current of charging power, however, the charging continuation permitting condition is not limited only to them. Another charging interrupt factor or a charging power drop factor not owing to an equipment failure may be included in the above-described charging continuation permitting condition.

Moreover, in the above description, vehicle 10 may be an electric vehicle on which an engine is not mounted, or may be a hybrid vehicle on which a motor and an engine as motive power supplies are mounted, or may be a fuel cell vehicle on which a fuel cell is further mounted as a DC power supply.

It is noted that, in the above description, charging schedule creation unit 102 corresponds to an example of "a creation unit" in the present invention, and charging control unit 104 corresponds to an example of "a control unit" in the present invention. Input device 30 corresponds to an example of "an input unit" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A charging control device for charging a power storage device mounted on a vehicle by a power supply outside the vehicle, comprising:
    a creation unit creating a charging schedule of said power storage device by said power supply; and
    a control unit executing charging control of said power storage device in accordance with said charging schedule,
    said control unit executing said charging control such that charging is continued even after a charging end timing in accordance with said charging schedule when a predetermined charging continuation permitting condition holds in the case where charging is not completed in accordance with said charging schedule,
    wherein said charging continuation permitting condition holds in the case where an air conditioner for adjusting a vehicle interior temperature is operated during charging.

2. The charging control device according to claim 1, wherein
    said control unit executes said charging control such that charging is continued even after a charging end time in accordance with said charging schedule when said predetermined charging continuation permitting condition holds in the case where charging is not completed at said charging end time.

3. The charging control device according to claim 1, wherein
    said control unit executes said charging control without following said charging schedule when said predetermined charging continuation permitting condition holds in the case where charging is not completed in accordance with said charging schedule.

4. The charging control device according to claim 1, wherein
    said control unit terminates charging at said charging end timing when said predetermined charging continuation permitting condition does not hold.

5. The charging control device according to claim 1, wherein
    said charging continuation permitting condition holds in the case where charging is interrupted due to a power failure of said power supply.

6. The charging control device according to claim 1, wherein
    said charging continuation permitting condition holds in the case where there is a change in setting of electric power supplied from said power supply.

7. The charging control device according to claim 1, further comprising
    an input unit for allowing a user to select whether or not charging is continued even after said charging end timing.

8. A vehicle comprising the charging control device as defined in claim 1.

9. A charging control method for charging a power storage device mounted on a vehicle by a power supply outside the vehicle, comprising the steps of:
    creating a charging schedule of said power storage device by said power supply; and
    executing charging control of said power storage device in accordance with said charging schedule,
    said step of executing said charging control including the step of continuing charging even after a charging end timing in accordance with said charging schedule when a predetermined charging continuation permitting condition holds in the case where charging is not completed in accordance with said charging schedule,
    wherein said charging continuation permitting condition holds in the case where an air conditioner for adjusting a vehicle interior temperature is operated during charging.

10. The charging control method according to claim 9, wherein
    said step of continuing charging includes the step of continuing charging even after a charging end time in accordance with said charging schedule when said predetermined charging continuation permitting condition holds in the case where charging is not completed at said charging end time.

11. The charging control method according to claim 9, wherein
    said charging continuation permitting condition holds in the case where charging is interrupted due to a power failure of said power supply.

12. The charging control method according to claim 9, wherein
    said charging continuation permitting condition holds in the case where there is a change in setting of electric power supplied from said power supply.

13. The charging control method according to claim 9, further comprising
    the step for allowing a user to select whether or not charging is continued even after said charging end timing.

14. The charging control device according to claim 1, wherein
- the control unit executes the charging control such that charging is continued even after the charging end time in response to the air conditioner being operated during charging, and
- the control unit terminates charging at the charging end timing in response to the air conditioner not being operated during charging.

15. The charging control method according to claim 9, wherein
- the step of continuing charging includes the step of continuing charging even after the charging end time in response to the air conditioner being operated during charging, and
- the step of continuing charging includes the step of terminating charging at the charging end timing in response to the air conditioner not being operated during charging.

* * * * *